United States Patent Office

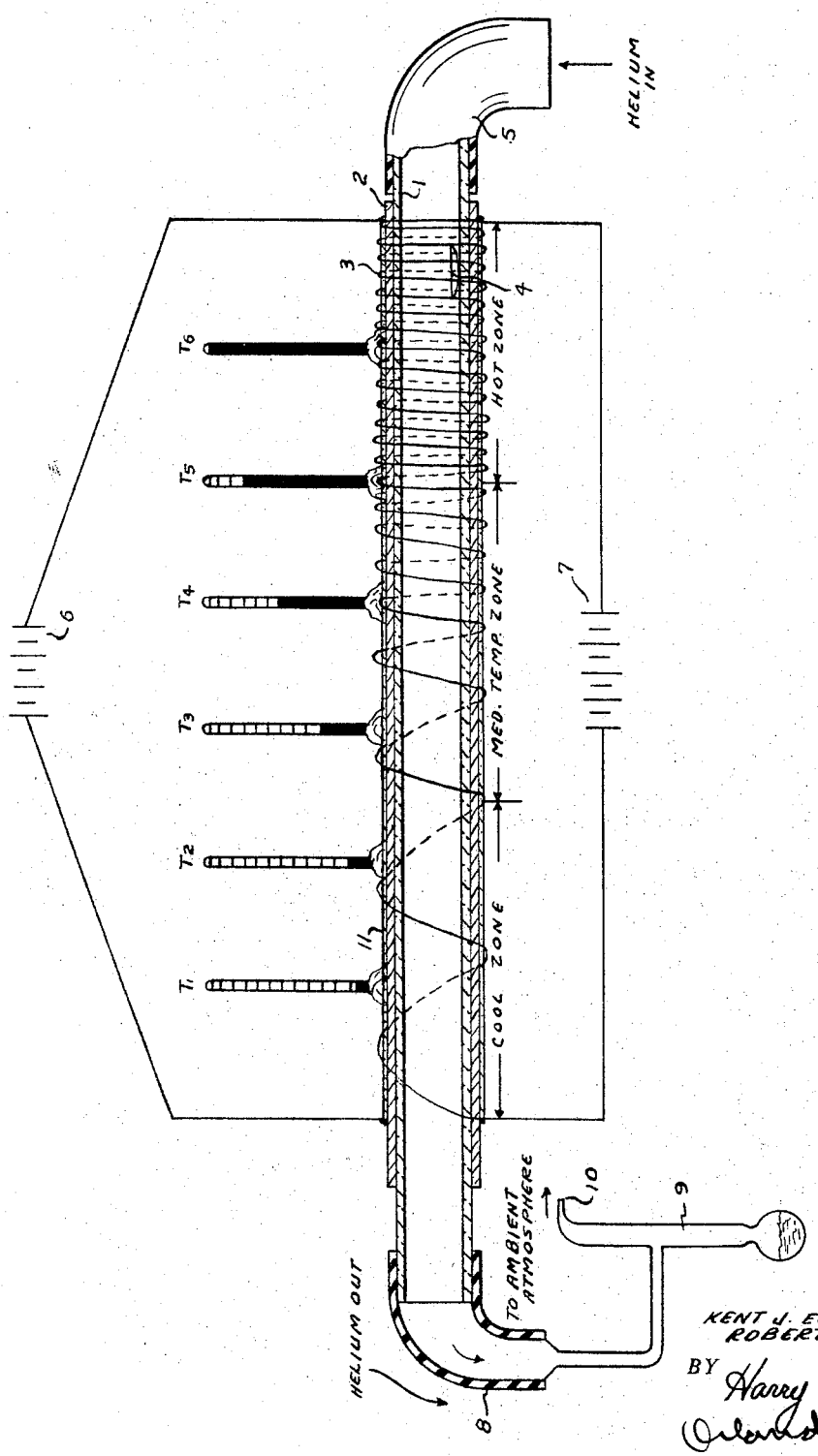

3,429,904
Patented Feb. 25, 1969

3,429,904
SEPARATION OF CHELATES OF RARE EARTH COMPOUNDS AND PROMETHIUM BY FRACTIONAL SUBLIMATION
Kent J. Eisentraut, 642 Turnbull Road, Dayton, Ohio 45431, and Robert E. Sievers, 2628 N. Emerald Drive, Fairborn, Ohio 45324
Filed Nov. 4, 1966, Ser. No. 592,692
U.S. Cl. 260—429.1
Int. Cl. C07f 5/00; C01g 57/00
3 Claims

ABSTRACT OF THE DISCLOSURE

The disclosure is the separation and purification of the rare earths and promethium as chelates by fractional deposition, with apparatus.

---

The invention described herein may be manufactured and used by or for the Government for governmental purposes without the payment to us of any royalty thereon.

This invention relates to the separation and the purification of volatile rare earth and promethium compounds by fractional sublimation and distillation and to an apparatus used with the process.

The attempted separation and the purification of the rare earth elements in the past have been quite difficult because of chemical and physical similarities in their characteristics. As a result, the rare earths are quite expensive.

The present invention serves to separate the rare earths and also promethium (Pm), as compounds, specifically chelates, cleanly and also to permit their sharp separation as pure elements as well as other applicable elements by successive fractional deposition or crystallization.

An object of the present invention is to provide a process for accomplishing the separation and the purification of volatile rare earth compounds and chelates.

Another object is to provide an apparatus and a process for successively increasing the isolation and the degree of purity of the rare earths, promethium and other elements to which the process is applicable by their fractional sublimation, distillation and crystallization.

The rare earth elements and their symbols in the order of their atomic numbers consist of scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Promethium (Pm) can also be considered a rare earth though it does not occur naturally and it is radioactive.

The order of volatility of the rare earth chelates containing the ligand 2,2,6,6-tetramethyl-3,5-heptanedione, hereinafter abbreviated H(thd) is about as follows:

$Sc(thd)_3 > Lu(thd)_3 > Yb(thd)_3 > Tm(thd)_3 > Er(thd)_3$
$> Y(thd)_3 > Ho(thd)_3 > Dy(thd)_3 > Tb(thd)_3$
$> Gd(thd)_3 > Eu(thd)_3 > Sm(thd)_3 > Nd(thd)_3$
$> Pr(thd)_3 > La(thd)_3$ of the general designation herein as $M(thd)_3$.

Prior methods in solving the problem of separating and purifying the rare earths were based on ion-exchange separations that are time consuming and expensive. In comparison, the present invention permits the easy separation of rare earths in the form of volatile complexes and then the conversion of the complexes into compounds such as the oxides that are of specific interest. Part of the invention that is disclosed herein appears in The Journal of The American Chemical Society, vol. 87, page 5254, dated November 20, 1965, and in Chemical and Engineering News, vol. 43, page 39, dated November 22, 1965.

The general synthesis of the volatile rare earth chelates is described here in the preparation of the volatile chelate tris (2,2,6,6-tetramethyl-3,5-heptanedionato)terbium and this general method can be used to prepare the volatile complexes of each of the designated rare earth elements.

Sixty millimoles, or mmoles, of 2,2,6,6-tetramethyl-3,5-heptanedione, referred to herein as H(thd), was dissolved in 30 cc. of 95% ethanol in a thick-walled flask fitted with a stopcock connected to a vacuum system. Sixty mmoles of reagent NaOH was dissolved in 50 cc. of 50% ethanol and was added to the reactant flask. The reactants were continuously stirred with a magnetic stirrer. Twenty mmoles of $Tb(NO_3)_3 \cdot 6H_2O$, prepared from the reaction of 99.9% $Tb_4O_7$ and concentrated $HNO_3$, was dissolved in 50 cc. of 50% ethanol and added to the solution. Immediately the reaction flask was evacuated, was sealed and was stirred for two hours. The volume of the solution was reduced by 50% by a reduced pressure distillation and then 350 cc. of distilled water was added to the solution. The $Tb(thd)_3$ which separated out was quickly vacuum filtered, dried, and sublimed at 180° C. at a pressure of 0.05 mm. of mercury. The yield of sublimed product was 13.17 grams for a 92.9% yield. The sublimed crystals were recrystallized from reagent grade n-hexane in vacuo and were vacuum dried and had a melting point of 177–180° C. When the crystals of $Tb(thd)_3$ were irradiated by an ultraviolet lamp at 3660 angstroms they emitted brilliant green fluorescence.

Other methods of synthesis, such as methods based on solvent extraction, ligand substitution reactions, etc., can also be used to accomplish the desired preparations. All of the rare earth elements have been converted into their appropriate volatile tris chelates of H(thd). All of these rare earth complexes are volatile and can be passed quantitatively into the gas phase intact without thermal degradation at reasonably low temperatures, for example, from 100 to 200° C. Excellent elemental analyses have been obtained on these volatile rare earth chelates. Analyses of the rare earth chelates so made were determined and reported by the Galbraith Laboratories of Knoxville, Tenn. The rare earth chelates so made were also characterized by their ultraviolet, visible, infrared, and proton nuclear magnetic resonance spectra, as well as by thermal gravimetric analyses and by measuring their vapor pressure as a function of temperature.

The purpose of this invention pertains to the method of purification and separation of the rare earth elements in the form of the above-described volatile chelates or similar derivatives expressed as $M(thd)_3$ wherein M indicates each of the above-listed rare earth elements. The volatile rare earth compounds may be purified by processing them singly, or mixtures of these compounds may be separated by positioning them in a hot end of a preferably Pyrex glass tube which is inserted into a brass tube within a longitudinally, temperature graduated, controlled heater. Helium, serving as carrier gas, is passed through the glass tube over the sample. The rare earth compounds that are more volatile vaporize and recondense in the cooler zones farther down the tube than do the compounds of lesser volatility.

In the single figure of the accompanying drawing is shown a schematic arrangement of an illustrative apparatus used in the practice of the process part of the present invention.

In the drawing, a glass tube 1 is inside of a brass tube 2 with a spiral winding 3 outside of and electrically insulated at 11 from the brass tube 2. A desired plurality of thermometer or thermocouple wells $T_1$–$T_6$ are spaced axially along the tubes 1 and 2. Each of the thermometer wells preferably contain a silicone fluid to insure heat conduction to the thermometer bulb. A sample is positioned in a fused quartz boat 4 and the sample charged boat is positioned within the glass tube 1 at the higher temperature end thereof.

The sample receiving end of the glass tube is closed with a resilient plastic cap 5 that conducts an inert carrier gas such as helium into the glass tube. A spiral heater winding 3 consists of a plurality of turns or loops that are axially spaced increasing distances apart from the hot zone within which the sample charged boat 4 is positioned, through a medium temperature zone to a cool temperature zone over which the spiral winding turns or loops are of maximum separation axially of the assembly.

A first variac 6 applies its output across the length of the brass tube 2 for an adjusted temperature uniformly along the entire length of the tube. A second variac 7 applies its output across the spiral winding 3. The terminal or discharge end of the glass tube 1 is sealed with a resilient plastic discharge cap 8 that conducts residual gases to a soap bubble flow meter 9 that opens through a small hole 10 or a capillary to minimize back flow from the ambient atmosphere. The soap bubble flow meter 9 may, if preferred, be replaced by a cold trap collector, not shown, leading to the ambient atmosphere for collection of very volatile impurities if they are present.

Illustrative of the method contemplated hereby, a mixture was made of two or more of the volatile chelates of the elements that are to be separated. The mixture was placed in the Pyrex sample boat 4 shown in the drawing. The boat was inserted into the fractional sublimation thermal gradient apparatus glass tube 1 at the hottest zone thereof, in the region of the thermometer $T_6$. Helium was then passed over the mixture and through the tube 1 at a desired flow rate.

The first variac 6 was then energized and adjusted to a desired setting in order to heat the entire tube assembly uniformly. The second variac 7 was then turned on for maintaining a desired temperature gradient along the tube assembly, such for example as 180° C. between the thermometers $T_5$ and $T_6$ and decreasing to a much lower temperature at the discharge end of the tube 1. By maintaining the proper heat gradient and by using an appropriate length and diameter tube, one can separate any desired mixture of these volatile rare earth complexes.

The most volatile rare earth component of the mixture that is inserted in the boat 4 will enter its gas phase in the boat area. This most volatile component will remain in the gas phase and by means of the carrier gas will pass down the tube 1 in its gas phase until it recondenses in crystalline form or in liquid droplets in a cooler temperature zone or band farther down the tube, which is characteristic of the particular rare earth complex under the conditions used.

A chelate of medium volatility in the mixture will enter the gas phase in the boat area and will pass along the tube 1 and will recondense in a warmer temperature zone near the middle of the tube length. The complex present in the mixture of least volatility will enter the gas phase in the boat area and will pass out of the boat and will recondense in a hot temperature zone nearest the boat. Nonvolatile components present will remain in the sample boat and will not volatilize. Very volatile materials, if present in the sample, will pass completely through the tube without recondensing and can be collected in a cold trap attached to the cool end of the tube 1, if this is desired.

The apparatus used herein is a modification of the device described by Berg and Hartlage, Analytica Chimica Acta 33, 173 (1965).

The apparatus shown in the accompanying drawing is allowed to run for a period of time from approximately 30 minutes to 24 hours at the proper conditions to effect the desired separation. The time required for operation is dependent upon the parameters of the carrier gas flow rate, the temperature of the operation, etc.

The variacs are then turned off and when the apparatus is cooled to room temperature the helium flow is disconnected and the Pyrex tube 1 is carefully removed from the thermal gradient apparatus.

The complexes are present in bands which are separated. The Pyrex tube is then cut in the appropriate places and the sections containing the separated, pure complexes are obtained. If desired, the separated rare earth complexes may be removed mechanically or by other means that do not necessitate cutting the glass. This method of operation will give separations of high purity.

Now that the rare earth elements are separated in the form of the volatile complexes, one is in the position to obtain any desired rare earth compound from the volatile complexes. The pure rare earth oxides are obtained by causing the pyrolysis or the hydrolysis of the volatile complex of the purified rare earth elements. Other useful compounds may be prepared by chemical treatment or by reduction to rare earth metals.

If desired, the free uncomplexed ligand 2,2,6,6-tetramethyl-3,5-heptanedione that is referred to herein as H(thd) or (thd)$^-$ can be regenerated for use in a cyclic process by appropriate chemical treatment such as by the hydrolysis of the product with water at elevated temperatures, or by the treatment of the product with acidified or alkaline aqueous reagents, or by treatment with $H_2S$, or with any other suitable reagent that will cause selective decomposition of the complex without destroying the ligand. Selected fluorocarbons and hydrocarbon derivatives of H(thd) function in a corresponding manner. With the recovery of the ligand, it can be used over and over again to form more volatile complexes. The volatile complexes so formed are separated and the ligand H(thd) is attained again from the regeneration steps.

In the event the rare earths occur in metallic ore or as the oxides, the rare earth is converted into the metallic nitrate, chloride, or sulfate, and is subjected to the general synthesis described earlier in obtaining the volatile complex of the rare earth.

The process that is described herein may be practiced as a single stage process, a two-stage process or a multistage process as preferred. For example, one stage may be used to separate the desired rare earths and then the gradient can be changed so that the complexes move down the tube to a new position thus increasing the purity of the separated fractions. This fractionation process may be repeated many times in a fractionating procedure for increasing the purity of the resultant product in following the practices of fractional sublimation and distillation.

A specific example of a separation obtained using a single stage apparatus described herein is started by mixing 0.1 g. Tb(thd)$_3$ and 0.1 g. La(thd)$_3$ and transferring them to the sample boat 4. The clean Pyrex tube 1, that is 107 cm. long and of 11 mm. outside diameter, was inserted inside the brass tube 2 of the apparatus. The sample charged boat 4 was inserted into the hot end of the Pyrex tube and was positioned between $T_5$ and $T_6$ on the diagram. Helium was passed through the tube at a flow rate of 10 ml. per minute. The first variac 6 was set at 18 volts and the second variac 7 was set at 65 volts. The experiment was run for 7 hours. Equilibrium temperatures along the tube were as follows at the appropriate thermometers:

| | °C. |
|---|---|
| $T_1$ | 60 |
| $T_2$ | 65 |
| $T_3$ | 110 |
| $T_4$ | 138 |
| $T_5$ | 189 |
| $T_6$ | 187 |

After 7 hours of operation, the variacs were turned off and the apparatus was allowed to cool to room temperature before the Pyrex tube was removed.

After the apparatus cooled, the Pyrex tube 1 was carefully removed and examined visually. Tb(thd)₃ and La(thd)₃ are both white crystals. However, when an ultraviolet lamp emitting radiation at 3660 angstroms is shined onto the Tb(thd)₃ a brilliant green fluorescence results, while under the same conditions La(thd)₃ shows no trace of fluorescence. Therefore, one can determine by visual means whether a separation has been achieved.

The Pyrex tube from this experiment showed an excellent separation. Tb(thd)₃ moved much farther into the cool zone than did La(thd)₃ and an area of clear tube separated the two compounds. The empty boat was carefully removed and discarded. The tube was then cut into the two segments, one containing the fluorescent crystals of Tb(thd)₃ and the other containing the nonfluorescent crystals of La(thd)₃. The crystals in the two sections were removed from the sections by rinsing the crystals in separate vials and then removing the solvent by evacuation in a vacuum.

The vials containing the individuals separated complexes were sent to Monsanto Research Corporation, Dayton Laboratory, Dayton, Ohio, for quantitative emission spectral analysis to determine the degree of purity of the separated complexes. The analyst determined the percent Tb present in the Lanthanum section and also the percent Lanthanum present in the Tb section. The quantitative results of the determination are:

Lanthanum section: Percent Tb present
  Run 1 ........................................ 0.072
  Run 2 ........................................ 0.068
  Run 3 ........................................ 0.066
  Run 4 ........................................ 0.063
  Average Tb present in the Lanthanum section ........................................ 0.067

Terbium section: Percent Lanthanum
  Run 1 ........................................ 0.340
  Run 2 ........................................ 0.351
  Run 3 ........................................ 0.366
  Average La present in the Terbium section .. 0.352

These quantitative results indicate that by simply using the one-stage apparatus and method described above, one can obtain separations of high purity. Greater degrees of purity result from the use of a corresponding multistage process. The rare earth complexes are converted to any desired rare earth compound with the potential regeneration of the ligand for further use.

Another quantitative separation that has been run using the single stage process is—

Nd(thd)₃ and Tb(thd)₃ separation: Percent
  Nd present in Tb(thd)₃ section ............. 2.80
  Tb present in Nd(thd)₃ section ............. 2.91

The apparatus described herein may be of any desired length and diameter. Carrier gases may be used selected from the group of helium, nitrogen, argon, etc. Where desired, a vacuum may be connected at the discharge end of the tube 1 with the slow admission of an inert gas at the input end of the tube 1. When preferred, the thermometers $T_1$–$T_6$ may be replaced by thermocouples for more accurately recording the temperature gradient along the tube 1. As previously mentioned, a two stage or multistage method is followed for enhancing the purity of separation and for easily achieving separations that might be difficult using the single stage method.

Illustratively, a mixture of the tris(2,2,6,6-tetramethyl-3,5-heptanedionato)lanthanum(III) and terbium(III) complexes was separated by fractional sublimation and distillation in a thermal gradient fractional sublimation apparatus. The separation was visually detected when the separated fractions were examined under ultraviolet light. The more volatile terbium complex was concentrated in the temperature zone from 82 to 139° C. The green fluorescence of the terbium complex was quite intense in this zone. In the zone where the nonfluorescent lanthanum complex was concentrated from 162 to 194° C., fluorescence of the terbium complex was barely detectable.

The transuranium elements, i.e., elements of atomic numbers 92 and above, were closely related chemically and physically with the rare earths and are within the concept of the present invention.

Although the use of volatile rare earth tris complexes of 2,2,6,6-tetramethyl-3,5-heptanedione has been stipulated herein, it is within the concept of the present invention that other volatile compounds of the rare earths may be used providing there is a difference in the volatiltiy of the complexes. Thus, tris or tetrakis or other higher coordination number complexes of this or other suitable ligands, such as hydrocarbon or fluorocarbon derivatives thereof, can be separated by this method, providing the individual complexes differ in volatility. A specific example of suitable fluorocarbon derivatives are the rare earth complexes of 1,1,1,2,2,3,3-heptafluoro-7,7-dimethyl-4,6-octanedione. The process disclosed herein is applicable to all volatile complexes of metals other than the rare earth metals that are to be separated from the rare earths and separated from other nonvolatile materials which remain in the sample boat. Broadly, the method that is disclosed herein is capable of separating volatile compounds of the above-designated metals from other compounds of another metal provided that there is a difference in volatility of the compounds of all metals to be separated from the rare earths.

The process that is disclosed herein can also be used for purifying any volatile rare earth compound from impurities of different volatilities. The method disclosed herein is used when growing single crystals of any volatile rare earth compound from its gaseous phase.

It is to be understood that the apparatus used and the process steps that are disclosed herein are submitted as being successfully operative embodiments of the present invention and that limited modifications in the apparatus, in the process steps and substitutions of equivalents in the compositions and metals stipulated may be made without departing from the spirit and the scope of the present invention.

We claim:

1. The process of separating and purifying the members of a group of elements selected from the rare earths and promethium by fractional sublimation and distillation by converting the separated group of elements into chelates by reacting them with the ligand 2,2,6,6-tetramethyl-3,5-heptanedione, introducing a sample of the separated group of chelates into a boat, inserting the charged boat into the higher temperature end of a thermal fractional sublimation and distillation hollow tube, passing an inert vapor carrier gas from the higher to the lower temperature ends of the tube until the fractional deposition of said chelates of said elements occurs along the tube at temperatures of separation from both the carrier gas and the associated vapors.

2. The method of claim 1 in which the rare earths chelates being separated are Tb and La.

3. The method of claim 1 in which the rare earths chelates being separated are Tb and Nd.

References Cited

UNITED STATES PATENTS 2,632,763  3/1953  Hagemann.
2,727,000  12/1955  Brewer et al. _____ 260—429.1 X

OTHER REFERENCES

Fried, AECD 1930, April 15, 1948, pp. 1 to 8.

LELAND A. SEBASTIAN, *Primary Examiner.*

U.S. Cl. X.R.

23—17, 294, 326; 260—429.2